United States Patent
Hirai et al.

(10) Patent No.: US 12,398,228 B2
(45) Date of Patent: Aug. 26, 2025

(54) METHOD FOR PRODUCING FLUOROSULFONYL GROUP-CONTAINING FLUORINATED POLYMER, METHOD FOR PRODUCING SALT-TYPE SULFONIC ACID GROUP- CONTAINING FLUORINATED POLYMER AND METHOD FOR PRODUCING ACID-TYPE SULFONIC ACID GROUP-CONTAINING FLUORINATED POLYMER

(71) Applicant: AGC Inc., Tokyo (JP)

(72) Inventors: Takeshi Hirai, Tokyo (JP); Susumu Saito, Tokyo (JP)

(73) Assignee: AGC Inc., Tokyo (JP)

( * ) Notice: Subject to any disclaimer, the term of this patent is extended or adjusted under 35 U.S.C. 154(b) by 1128 days.

(21) Appl. No.: 17/331,098

(22) Filed: May 26, 2021

(65) Prior Publication Data
US 2021/0284772 A1    Sep. 16, 2021

Related U.S. Application Data

(63) Continuation of application No. PCT/JP2019/047949, filed on Dec. 6, 2019.

(30) Foreign Application Priority Data

Dec. 7, 2018 (JP) .................. 2018-230213
Feb. 28, 2019 (JP) .................. 2019-036946

(51) Int. Cl.
*C08F 216/14* (2006.01)
*C08J 5/22* (2006.01)

(52) U.S. Cl.
CPC ......... *C08F 216/1475* (2020.02); *C08J 5/225* (2013.01)

(58) Field of Classification Search
CPC . H01M 8/1039; C08F 14/185; C08F 214/182; C08F 214/26; C08F 216/1475; C08F 116/14
See application file for complete search history.

(56) References Cited

U.S. PATENT DOCUMENTS

| | | | |
|---|---|---|---|
| 11,414,502 B2 * | 8/2022 | Hirai | C08F 8/12 |
| 2008/0138685 A1 * | 6/2008 | Kaneko | H01M 8/1039 |
| | | | 429/492 |
| 2020/0190025 A1 * | 6/2020 | Hirai | C25B 1/04 |
| 2020/0190233 A1 * | 6/2020 | Hirai | C25B 1/02 |

FOREIGN PATENT DOCUMENTS

| | | |
|---|---|---|
| EP | 1914824 A1 | 4/2008 |
| JP | 4848587 B2 | 12/2011 |
| JP | 5217708 B2 | 6/2013 |
| JP | 5862372 B2 | 2/2016 |
| WO | WO-2018012374 A1 | 1/2018 |
| WO | WO 2019/045063 A1 | 3/2019 |
| WO | WO 2019/045064 A1 | 3/2019 |

OTHER PUBLICATIONS

Nauman, E. B. Bulk and Solution Polymerization Reactors. Encyclopedia of Polymer Science and Technology. pp. 307-317. John Wiley & Sons, Inc. 2002. (Year: 2002).*
International Search Report issued Mar. 10, 2020 in PCT/JP2019/047949, filed on Dec. 6, 2019, 3 pages.

* cited by examiner

*Primary Examiner* — Stephen E Rieth
(74) *Attorney, Agent, or Firm* — Element IP, PLC

(57) ABSTRACT

To provide a method for producing a polymer, whereby it is possible to obtain a sulfonic acid group-containing polymer having a high TQ value and a high ion exchange capacity. A method for producing a fluorosulfonyl group-containing fluorinated polymer, which comprises polymerizing a monomer represented by the following formula m1 and tetrafluoroethylene, at a temperature of at least 110° C. and at most 250° C.:

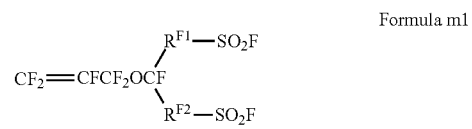

Formula m1 in the above formula, $R^{F1}$ and $R^{F2}$ are each a $C_{1-3}$ perfluoroalkylene group.

7 Claims, No Drawings

METHOD FOR PRODUCING FLUOROSULFONYL GROUP-CONTAINING FLUORINATED POLYMER, METHOD FOR PRODUCING SALT-TYPE SULFONIC ACID GROUP- CONTAINING FLUORINATED POLYMER AND METHOD FOR PRODUCING ACID-TYPE SULFONIC ACID GROUP-CONTAINING FLUORINATED POLYMER

TECHNICAL FIELD

The present invention relates to a method for producing a fluorosulfonyl group-containing fluorinated polymer, a method for producing a salt-type sulfonic acid group-containing fluorinated polymer, and a method for producing an acid-type sulfonic acid group-containing fluorinated polymer.

BACKGROUND ART

A polymer electrolyte fuel cell may, for example, be one in which a membrane electrode assembly is sandwiched between two separators to form a cell, and a plurality of such cells are stacked. The membrane electrode assembly is one comprising an anode and a cathode each having a catalyst layer, and a polymer electrolyte membrane disposed between the anode and the cathode. The polymer electrolyte membrane may, for example, be one in which a polymer having acid-type sulfonic acid groups or salt-type sulfonic acid groups is made into a membrane.

The polymer having acid-type sulfonic acid groups or salt-type sulfonic acid groups to be used for a polymer electrolyte membrane is desired to have a high ion exchange capacity. When the ion exchange capacity is high, the conductivity of ions is improved, and therefore, for example, improvement of power generation performance of a polymer electrolyte fuel cell, or reduction of the electric power consumption rate due to a decrease of overvoltage such as the membrane resistance in chlor-alkali electrolysis, can be expected.

As a polymer having a high ion exchange capacity, a sulfonic acid group-containing polymer has been proposed, in which fluorosulfonyl groups of a fluorosulfonyl group-containing polymer having units based on a monomer having a fluorosulfonyl group and units based on tetrafluoroethylene in one molecule, are converted to sulfonic acid groups (Patent Documents 1 to 3).

PRIOR ART DOCUMENTS

Patent Documents

Patent Document 1: Japanese Patent No. 4848587
Patent Document 2: Japanese Patent No. 5217708
Patent Document 3: Japanese Patent No. 5862372

DISCLOSURE OF INVENTION

Technical Problem

On the other hand, it is desirable that the fluorosulfonyl group-containing polymer, which is a precursor of the sulfonic acid group-containing fluorinated polymer, has a high TQ value as an index for the molecular weight.

The present inventors have evaluated the characteristics of the prior art, but have found it impossible to obtain a polymer whereby the ion exchange capacity of a sulfonic acid group-containing fluorinated polymer is high, and the TQ value of a fluorosulfonyl group-containing polymer, which is a precursor of the sulfonic acid group-containing fluorinated polymer, is high.

An object of the present invention is to provide a method for producing a fluorosulfonyl group-containing polymer, whereby the TQ value is high, and it is possible to obtain a sulfonic acid group-containing fluorinated polymer having a high ion exchange capacity.

Solution to Problem

The present invention has the following embodiments.
[1] A method for producing a fluorosulfonyl group-containing fluorinated polymer, characterized by polymerizing a monomer represented by the following formula m1 and tetrafluoroethylene at a temperature of at least 110° C. and at most 250° C.:

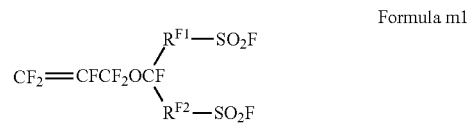

Formula m1 in the above formula, $R^{F1}$ and $R^{F2}$ are each independently a $C_{1-3}$ perfluoroalkylene group.
[2] The method for producing a fluorosulfonyl group-containing fluorinated polymer according to [1], wherein the TQ value of the fluorosulfonyl group-containing fluorinated polymer is at least 220° C.
[3] The method for producing a fluorosulfonyl group-containing fluorinated polymer according to [1] or [2], wherein the amount of the fluorosulfonyl group-containing fluorinated polymer to be produced per 100 g in the total amount of the monomer represented by the formula m1 charged before and during the polymerization and per hour of the polymerization time, is at least 1.0 g.
[4] A method for producing a salt-type sulfonic acid group-containing fluorinated polymer, characterized by hydrolyzing the fluorosulfonyl groups of the fluorosulfonyl group-containing fluorinated polymer produced by the production method as defined in any one of [1] to [3] to form salt-type sulfonic acid groups.
[5] The method for producing a salt-type sulfonic acid group-containing fluorinated polymer according to [4], wherein the ion exchange capacity of the salt-type sulfonic acid group-containing fluorinated polymer is from 1.81 to 2.50 milliequivalent/gram dry resin.
[6] A method for producing an acid-type sulfonic acid group-containing fluorinated polymer, characterized by converting the salt-type sulfonic acid groups in the salt type sulfonic acid group-containing fluorinated polymer produced by the production method as defined in [4] or [5] to an acid-type to obtain acid-type sulfonic acid groups.
[7] The method for producing an acid-type sulfonic acid group-containing fluorinated polymer according to [6], wherein the ion exchange capacity of the acid-type sulfonic acid group-containing fluorinated polymer is from 1.81 to 2.50 milliequivalent/gram dry resin.

Advantageous Effects of Invention

According to the present invention, a fluorosulfonyl group-containing fluorinated polymer having a high TQ value can be obtained, and from that polymer, a sulfonic acid group-containing fluorinated polymer having a high ion exchange capacity can be obtained.

DESCRIPTION OF EMBODIMENTS (Definitions of Terms, Etc.)

The following definitions and descriptions of terms apply throughout the specification and claims.

A "sulfonic acid group" is a general term for a salt-type sulfonic acid group ($-SO_3^-M^+$, where $M^+$ is a metal ion or an ammonium ion) and an acid-type sulfonic acid group ($-SO_3^-H^+$).

In the present specification, a monomer represented by the formula m1 is referred to as monomer m1. Monomers represented by other formulas are also referred to in the same manner.

In the present specification, a compound represented by the formula 1 is referred to as compound 1. Compounds represented by other formulas are also referred to in the same manner.

A "unit" in a polymer means an atomic group derived from one molecule of a monomer, which is formed by polymerization of the monomer. A unit may be an atomic group directly formed by the polymerization reaction, or may be an atomic group in which a part of the atomic group is converted to another structure by processing the polymer obtained by the polymerization reaction.

In the present specification, units represented by the formula u1 are referred to as units u1. The structural units represented by other formulas are also referred to in the same manner.

The productivity index (Rp) value of a polymer indicates the amount of the polymer (g) produced per 100 g of the total amount of fluorosulfonyl group-containing monomers charged before and during the polymerization, and per hour of the polymerization time.

The "ion exchange capacity" of a polymer is obtained by the method described in Examples.

The "TQ value" of a polymer is obtained by the method described in Examples.

The "conductivity" of a polymer is obtained by the method described in Examples.

(Method for Producing Fluorosulfonyl Group-Containing Fluorinated Polymer)

The method for producing a fluorosulfonyl group-containing fluorinated polymer of the present invention has a step (hereinafter referred to also as "polymerization step") of polymerizing a monomer represented by the following formula m1 and tetrafluoroethylene (hereinafter referred to also as "TFE") at a temperature of at least 110° C. and at most 250° C.

(Monomer m1)

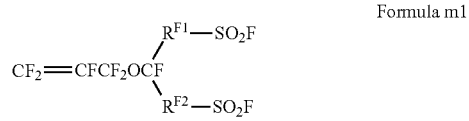

Formula m1

In the above formula m1, $R^{F1}$ and $R^{F2}$ are each independently a $C_{1-3}$ perfluoroalkylene group. $R^{F1}$ and $R^{F2}$ may be the same or different.

As $R^{F1}$ and $R^{F2}$, $-CF_2-$, $-CF_2CF_2-$, $-CF(CF_3)-$, $-CF_2CF_2CF_2-$, $-CF(CF_2CF_3)-$, $-CF(CF_3)CF_2-$, $-CF_2CF(CF_3)-$, $-C(CF_3)(CF_3)-$, etc. may be mentioned. From such a viewpoint that the raw material is cheaper and the ion exchange capacity of the sulfonic acid group-containing polymer can be made to be higher, $R^{F1}$ and $R^{F2}$ preferably have 1 to 2 carbon atoms, and are preferably straight-chain. Specifically, $-CF_2-$, $-CF_2CF_2-$ or $-CF(CF_3)-$ is preferred, and $-CF_2-$ is more preferred.

The monomer m1 may, for example, be monomer m1-1.

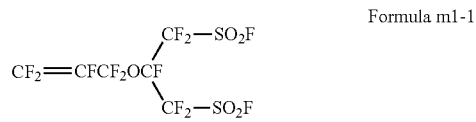

Formula m1-1

The monomer m1 can be produced, for example, as follows.

Compound 1 is reacted with a sulfonating agent to obtain compound 2.

Compound 2 is reacted with a chlorinating agent to obtain compound 3.

Compound 3 is reacted with a fluorinating agent to obtain compound 4.

Compound 4 is fluorinated to obtain compound 5.

Compound 5 is reacted with a perfluoroallylating agent (for example compound 6 as described later) to obtain monomer m1.

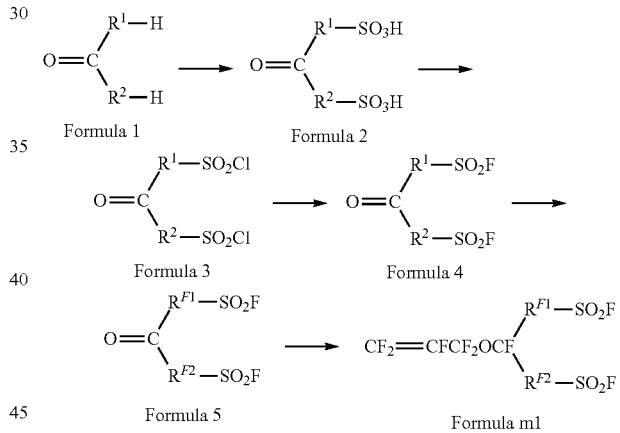

Here, $R^1$ and $R^2$ are each independently a $C_{1-3}$ alkylene group. $R^1$ and $R^2$ may be the same or different.

As $R^1$ and $R^2$, for example, $-CH_2-$, $-CH_2CH_2-$, $-CH(CH_3)-$, $-CH_2CH_2CH_2-$, $-CH(CH_2CH_3)-$, $-CH(CH_3)CH_2-$, $-CH_2CH(CH_3)-$ and $-C(CH_3)(CH_3)-$ may be mentioned. From such a viewpoint that the raw material compound 1 is cheaper, the monomer m1 can be easily produced, and the ion exchange capacity of the sulfonic acid group-containing polymer obtainable from the polymer of the present invention can be made to be higher, $R^1$ and $R^2$ are each preferably a $C_{1-2}$ alkylene group. In the case of 2 carbon atoms, a straight chain is preferred. Specifically, $-CH_2-$, $-CH_2CH_2-$ or $-CH(CH_3)-$ is preferred, and $-CH_2-$ is more preferred.

As the compound 1, acetone, methyl ethyl ketone, diethyl ketone, methyl propyl ketone, ethyl propyl ketone, dipropyl ketone, diisopropyl ketone, isopropyl methyl ketone, isopropyl ethyl ketone or isopropyl propyl ketone may be mentioned. Acetone is preferred, from such a viewpoint that the compound 1 is cheaper, production of the monomer m1 is easy, and the ion exchange capacity per unit molecular weight of the sulfonic acid group-containing polymer obtainable from the polymer of the present invention can be made to be higher.

The sulfonating agent may, for example, be chlorosulfonic acid, fluorosulfonic acid, sulfur trioxide, a complex of sulfur trioxide, fuming sulfuric acid, or concentrated sulfuric acid.

The reaction temperature of the compound 1 and the sulfonating agent is preferably from 0 to 100° C. The reaction solvent can be suitably selected from solvents which are less likely to be sulfonated themselves. The reaction solvent may, for example, be methylene chloride, chloroform, carbon tetrachloride, 1,1,1-trichloromethane, cyclohexane, hexane, petroleum ether, pentane, heptane, diethyl ether, acetonitrile or diethyl carbonate. As the reaction solvent, two or more types may be used as mixed.

The chlorinating agent may, for example, be thionyl chloride, phosphorus pentachloride, phosphorus trichloride, phosphoryl chloride, chlorosulfonic acid, sulfuryl chloride, oxalyl chloride or chlorine.

The reaction temperature of the compound 2 and the chlorinating agent is preferably from 0 to 100° C. When the reaction temperature is at most the upper limit value in the above range, decomposition of the compound 3 can be suppressed, whereby the yield of the compound 3 is improved. When the reaction temperature is at least the lower limit value in the above range, the reaction rate is increased, and the productivity is improved.

The fluorinating agent may, for example, be potassium hydrogen fluoride, sodium hydrogen fluoride, potassium fluoride, sodium fluoride, cesium fluoride, silver fluoride, quaternary ammonium fluoride (tetraethylammonium fluoride, tetrabutylammonium fluoride, etc.), hydrogen fluoride, hydrofluoric acid or a hydrogen fluoride complex (HF-pyridine complex, HF-triethylamine, etc.).

The reaction temperature of the compound 3 and the fluorinating agent is preferably from −30 to 100° C. The reaction solvent can be suitably selected from polar solvents or low polar solvents which are less susceptible to the fluorination reaction. The reaction solvent may, for example, be methylene chloride, chloroform, carbon tetrachloride, 1,1,1-trichloromethane, diethyl ether, dioxane, tetrahydrofuran, dimethoxyethane, diethylene glycol dimethyl ether, tetraethylene glycol dimethyl ether, dimethyl sulfoxide, sulfolane, N,N-dimethylformamide, acetonitrile, dimethyl carbonate, diethyl carbonate, ethylene carbonate, propylene carbonate or water. As the reaction solvent, two or more types may be used as mixed.

The compound 4 can also be synthesized directly from the compound 1. For example, the compound 1 is reacted with sulfuryl fluoride to obtain the compound 4. The reaction temperature of the compound 1 and sulfuryl fluoride is preferably from −30 to 100° C. The reaction solvent can be suitably selected from polar solvents or low polar solvents which are less likely to undergo a reaction with sulfuryl fluoride. The reaction solvent may, for example, be methylene chloride, chloroform, carbon tetrachloride, 1,1,1-trichloromethane, diethyl ether, dioxane, tetrahydrofuran, dimethoxyethane, diethylene glycol dimethyl ether, tetraethylene glycol dimethyl ether, dimethyl sulfoxide, sulfolane, N,N-dimethylformamide, acetonitrile, dimethyl carbonate, diethyl carbonate, ethylene carbonate or propylene carbonate. As the reaction solvent, two or more types may be used as mixed. In order to accelerate the reaction, a reaction accelerator such as a tertiary amine may be added for the reaction. The reaction may be carried out under pressure by charging sulfuryl fluoride gas in a reactor charged with a mixed solution of the compound 1 and a solvent, may be carried out by liquefying sulfuryl fluoride under cooling conditions, or may be carried out by bubbling sulfuryl fluoride under normal pressure in a mixed solution of the compound 1 and a solvent.

The fluorination treatment is carried out by bringing the compound 4 into contact with a fluorine gas or a fluorine compound.

The fluorine compound may, for example, be hydrogen fluoride, a halogen fluoride (chlorine trifluoride, iodine pentafluoride, etc.), a gaseous fluoride (boron trifluoride, nitrogen trifluoride, phosphorus pentafluoride, silicon tetrafluoride, sulfur hexafluoride, etc.), a metal fluoride (lithium fluoride, nickel (II) fluoride, etc.), a hypofluorite compound (trifluoromethylhypofluorite, trifluoroacetylhypofluorite, etc.) or an electrophilic fluorinating reagent (Selectfluor (registered trademark), N-fluorobenzenesulfonimide, etc.).

As the fluorination treatment, a treatment in which the compound 4 and the fluorine gas are brought into contact with each other is preferred from the viewpoint of easy handling and reduction of impurities to be contained in the compound 5. Fluorine gas may be used as diluted with an inert gas such as nitrogen gas before use. The temperature of the fluorination treatment is preferably from −20 to 350° C. The reaction solvent can be suitably selected from solvents in which solubility of the compound 4 or the compound 5 is high and which are less susceptible to the fluorination treatment themselves. The reaction solvent may, for example, be acetonitrile, chloroform, dichloromethane, trichlorofluoromethane, a perfluorotrialkylamine (perfluorotributylamine, etc.), a perfluorocarbon (perfluorohexane, perfluorooctane, etc.), a hydrofluorocarbon (1H,4H-perfluorobutane, 1H-perfluorohexane, etc.), a hydrochlorofluorocarbon (3,3-dichloro-1,1,1,2,2-pentafluoropropane, 1,3-dichloro-1,1,2,2,3-pentafluoropropane, etc.) or a hydrofluoroether ($CF_3CH_2OCF_2CF_2H$, etc.).

Further, there may be a case where, in the presence of hydrogen fluoride (HF), the compound 5 is in equilibrium with an alcohol form in which hydrogen fluoride is added to the O=C<portion to form HO—CF<, or it becomes an alcohol form. In the present specification, even when simply referred to as compound 5, it may represent either one or both of compound 5 and the alcohol form.

As the perfluoroallylating agent, compound 6 may be mentioned.

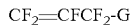  Formula 6 where G is $-OSO_2F$, $-OSO_2R^f$, a chlorine atom, a bromine atom or an iodine atom, and $R^f$ is a $C_{1-8}$ perfluoroalkyl group.

As the compound 6, compound 6-1 is preferred from the viewpoint of availability of raw materials, the reactivity of the perfluoroallylating agent, ease of synthesis, and ease of handling.

  Formula 6-1

The compound 6-1 can be produced, for example, by reacting hexafluoropropylene with sulfur trioxide in the presence of boron trifluoride. Instead of boron trifluoride, a boron trifluoride diethyl ether complex or a Lewis acid such as trimethoxyborane may be used.

The reaction of the compound 5 with the perfluoroallylating agent is preferably carried out in the presence of a fluoride salt. The fluoride salt may, for example, be potassium fluoride, cesium fluoride, silver fluoride, quaternary ammonium fluoride or sodium fluoride.

The reaction temperature of the compound 5 and the perfluoroallylating agent is preferably from −70 to 40° C. The reaction solvent preferably contains an aprotic polar solvent, and more preferably only an aprotic polar solvent. The aprotic polar solvent may, for example, be monoglime, diglime, triglime, tetraglime, acetonitrile, propionitrile, adiponitrile, benzonitrile, dioxane, tetrahydrofuran, N,N-dimethylformamide, dimethyl sulfoxide, N-methylpyrrolidone or nitroethane. As the reaction solvent, two or more types may be used as mixed.

In the method for producing a fluorosulfonyl group-containing fluorinated polymer of the present invention, as the case requires, a monomer (hereinafter referred to as "other monomer") other than the monomer m1 and TFE may be polymerized in the polymerization step in a range not to impair the effects of the present invention.

Other monomer may, for example, be trifluoroethylene, chlorotrifluoroethylene, vinylidene fluoride, vinyl fluoride, ethylene, propylene, a (perfluoroalkyl)ethylene or a (perfluoroalkyl) propene.

The polymerization temperature in the polymerization step is at least 110° C. and at most 250° C., and from such a viewpoint that the effects of the present invention will be more excellent, preferably from 120 to 230° C., more preferably from 140 to 200° C., particularly preferably from 147 to 168° C.

The polymerization method in the polymerization step is not particularly limited so long as the polymerization temperature is at least 110° C. and at most 250° C., and, for example, a bulk polymerization method, a solution polymerization method, a suspension polymerization method or an emulsion polymerization method may be mentioned. Alternatively, the polymerization may be conducted in a liquid or supercritical carbon dioxide.

The polymerization is carried out under such a condition that radicals are generated. The method for generating radicals may, for example, be a method of irradiating radiation such as ultraviolet rays, γ-rays or electron beams, or a method of adding a radical initiator.

The radical initiator may, for example, be a bis(fluoroacyl) peroxide, a bis(perfluoroalkyl) peroxide, a bis(chlorofluoroacyl) peroxide, a dialkyl peroxide, a peroxyester, an azo compound or a persulfate, and from such a viewpoint that a polymer having less unstable terminal groups is obtainable, a perfluoro compound such as a bis(fluoroacyl) peroxide or a bis(perfluoroalkyl) peroxide is preferred.

As the solvent to be used in the solution polymerization method, a solvent having a boiling point of from 20 to 350° C. is preferred, and a solvent having a boiling point of from 40 to 250° C. is more preferred. When the solvent has a low boiling point, scaling prevention can be expected by washing away the gas phase portion of the polymerization reactor by internal reflux. When the solvent has a high boiling point, the effect of lowering the polymerization pressure can be expected. The solvent may, for example, be a perfluorotrialkylamine (perfluorotributylamine, etc.), a perfluorocarbon (perfluorohexane, perfluorooctane, etc.), a hydrofluorocarbon (1H,4H-perfluorobutane, 1H-perfluorohexane, etc.), a hydrochlorofluorocarbon (3,3-dichloro-1,1,1,2,2-pentafluoropropane, 1,3-dichloro-1,1,2,2,3-pentafluoropropane, etc.) or a hydrofluoroether ($CF_3CH_2OCF_2CF_2H$, etc.).

In the solution polymerization method, a monomer, a radical initiator, etc. are added in the solvent, so that radicals are generated in the solvent to polymerize the monomer. The addition of the monomer and the radical initiator may be a batch addition, an intermittent addition, or a continuous addition.

In the suspension polymerization method, it is preferred to use water as a dispersion medium, add a monomer, a nonionic radical initiator, etc. in the dispersion medium, and generate radicals in the dispersion medium to polymerize the monomer.

The nonionic radical initiator may, for example, be a bis(fluoroacyl) peroxide, a bis (chlorofluoroacyl) peroxide, a dialkyl peroxydicarbonate, a diacyl peroxide, a peroxyester, a dialkyl peroxide, a bis(fluoroalkyl) peroxide or an azo compound.

To the dispersion medium, for example, an organic solvent as an auxiliary agent, a surfactant as a dispersion stabilizer to prevent aggregation of suspended particles, or a hydrocarbon compound (hexane, methanol, etc.) as a molecular weight controlling agent, may be added.

In the emulsion polymerization method, a monomer is emulsified in water in the presence of an emulsifier and a polymerization initiator to polymerize the monomer. As the emulsifier and the polymerization initiator, reagents to be used in the usual emulsion polymerization of perfluoropolymers can be used. For example, as the emulsifier, an ammonium salt of perfluorocarboxylic acid such as $CF_3CF_2CF_2CF_2OCF_2COONH_4$ or $CF_3CF_2OCF_2CF_2OCF_2COONH_4$ may be used. As the polymerization initiator, a radical initiator such as a peroxide, an azo compound or a persulfate may be used. Otherwise, the initiator may be used as activated by a redox reaction of metal ions, etc. Further, in addition to these, a buffering agent, a chain transfer agent or the like to be used in the usual emulsion polymerization of perfluoropolymers may be suitably used. Further, in order to increase the reaction rate of a fluorine-containing monomer, a mixed solution of an aqueous solvent and the fluorine-containing monomer may be forcibly emulsified by using a homogenizer, a pressure emulsifier or the like before the start of polymerization.

(Fluorosulfonyl Group-Containing Fluorinated Polymer)

The fluorosulfonyl group-containing fluorinated polymer obtainable by the method of the present invention is, for example, a sulfonyl group-containing polymer (hereinafter referred to as "polymer F") having units u1 represented by the following formula u1 and units based on tetrafluoroethylene (TFE).

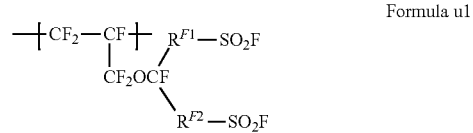

Formula u1

In the formula u1, $R^{F1}$ and $R^{F2}$ are the same as $R^{F1}$ and $R^{F2}$ as described in the formula m1, and the preferred forms are also the same.

The TQ value of the polymer F is preferably at least 220° C., more preferably at least 225° C., further preferably at least 230° C., particularly preferably at least 250° C. When the TQ value is at least the lower limit value, a polymer having a sufficient molecular weight can be obtained, so that the mechanical strength of the membrane of the sulfonic acid group-containing polymer obtainable from the polymer will be more excellent.

On the other hand, the TQ value is preferably at most 500° C., more preferably at most 450° C. When the TQ value is at most the upper limit value, a polymer having good heat moldability such as melt molding can be obtained. The TQ value is an index for the molecular weight of the polymer F.

In the method for producing a fluorosulfonyl group-containing fluorinated polymer of the present invention, the Rp value as the amount of the fluorosulfonyl group-containing fluorinated polymer to be formed per 100 g of the total amount of the monomer m1 charged before and during the polymerization and per hour of the polymerization time, is preferably at least 1.0, more preferably at least 1.3, further preferably at least 1.6, particularly preferably at least 2.0.

(Method for Producing Salt-Type Sulfonic Acid Group-Containing Fluorinated Polymer)

In the method for producing a salt-type sulfonic acid group-containing fluorinated polymer of the present invention, fluorosulfonyl groups of the polymer F of the present invention are converted to salt-type sulfonic acid groups.

The method for converting fluorosulfonyl groups to salt-type sulfonic acid groups may be a method of hydrolyzing fluorosulfonyl groups of the polymer F to form salt-type sulfonic acid groups.

(Method for Producing Acid-Type Sulfonic Acid Group-Containing Fluorinated Polymer)

In the method for producing an acid-type sulfonic acid group-containing fluorinated polymer of the present invention, fluorosulfonyl groups of the polymer F of the present invention are converted to sulfonic acid groups.

As a method for converting fluorosulfonyl groups to sulfonic acid groups, there may be a method in which the fluorosulfonyl groups of the polymer F are hydrolyzed to salt-type sulfonic acid groups, and the salt-type sulfonic acid groups are converted to an acid-type to form acid-type sulfonic acid groups. When salt-type sulfonic acid groups are required, acid-type conversion is not carried out.

The hydrolysis is carried out, for example, by bringing the polymer F into contact with a basic compound in a solvent. The basic compound may, for example, be sodium hydroxide, potassium hydroxide or triethylamine. The solvent may, for example, be water or a mixed solvent of water and a polar solvent. The polar solvent may, for example, be an alcohol (methanol, ethanol, etc.) or dimethyl sulfoxide.

Conversion to an acid-type is carried out, for example, by bringing a polymer having salt-type sulfonic acid groups into contact with an aqueous solution of hydrochloric acid, sulfuric acid, nitric acid or the like. The temperature for the hydrolysis and conversion to an acid-type is preferably from 0 to 120° C. It is preferred to wash the polymer with water after the hydrolysis or conversion to an acid-type.

In order to remove organic substances contained as impurities in the polymer, the organic substances may be decomposed by a treatment such as immersing the polymer in a hydrogen peroxide solution in the form of the salt type after the hydrolysis or after the conversion to the acid-type.

(Acid-Type Sulfonic Acid Group-Containing Fluorinated Polymer, Salt-Type Sulfonic Acid Group-Containing Fluorinated Polymer)

The acid-type sulfonic acid group-containing fluorinated polymer or salt-type sulfonic acid group-containing fluorinated polymer obtainable by the method of the present invention is, for example, a sulfonic acid group-containing polymer (hereinafter referred to also as "polymer H") having units u2 represented by the following formula u2 and units based on tetrafluoroethylene (TFE).

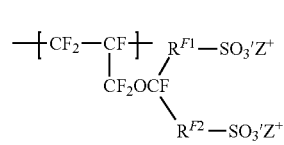

Formula u2

In the formula u2, $R^{F1}$ and $R^{F2}$ are the same as $R^{F1}$ and $R^{F2}$ described in the formula m1, and the preferred forms are also the same. $Z^+$ is $H^+$, a metal ion or an ammonium ion. As the metal ion, an alkali metal is preferred.

The ion exchange capacity of the polymer H is preferably at least 1.81 milliequivalent/gram dry resin, more preferably at least 1.90 milliequivalent/gram dry resin, further preferably at least 2.00 milliequivalent/gram dry resin. The ion exchange capacity of the polymer H is preferably at most 2.50 milliequivalent/gram dry resin, more preferably at most 2.45 milliequivalent/gram dry resin, further preferably at most 2.40 milliequivalent/gram dry resin. When the ion exchange capacity is at least the lower limit value in the above range, the ionic conductivity of the polymer H becomes high. Therefore, when used for a polymer electrolyte membrane or a catalyst layer in a polymer electrolyte fuel cell, sufficient cell output is obtainable. When the ion exchange capacity is at most the upper limit value in the above range, the swelling when the polymer H is saturated is suppressed, and the mechanical strength becomes high when the polymer H is made into a polymer electrolyte membrane.

EXAMPLES

Hereinafter, the present invention will be specifically described with reference to Examples. Ex. 1 is a Synthetic Example, Ex. 3 to Ex. 6 are Examples of the present invention, and Ex. 2 and Ex. 7 to Ex. 11 are Comparative Examples. However, the present invention is not limited to these Examples.

In the following, "polymer F" is a general term for fluorosulfonyl group-containing fluorinated polymers according to Examples. Further, "polymer F'" is a general term for fluorosulfonyl group-containing fluorinated polymers according to Comparative Examples.

($^1$H-NMR)

$^1$H-NMR was measured under the conditions of frequency: 300.4 MHz and chemical shift standard: tetramethylsilane. Unless otherwise specified, $CD_3CN$ was used as the solvent. The quantification of a product was carried out from the analysis result of $^1$H-NMR and the amount of the internal standard sample (1,3-bis(trifluoromethyl)benzene) added.

($^{19}$F-NMR)

$^{19}$F-NMR was measured under the conditions of frequency: 282.7 MHZ, solvent: $CD_3CN$, and chemical shift standard: $CFCl_3$. The quantification of a product was carried out from the analysis result of $^{19}$F-NMR and the amount of the internal standard sample (1,3-bis(trifluoromethyl)benzene) added.

($^{13}$C-NMR)

$^{13}$C-NMR was measured under the conditions of frequency: 75.5 MHz and chemical shift standard: tetramethylsilane. Unless otherwise specified, $CD_3CN$ was used as the solvent.

(Yield)

Yield means the yield of the reaction step×the yield of the purification step. The reaction yield means the yield of the reaction step before purifying the target product, which does not include the loss of the purification step.

(Ion Exchange Capacity)

The ion exchange capacity (milliequivalent/gram dry resin) of the polymer F or polymer F' was obtained as follows.

A membrane of the polymer F or polymer F' was vacuum dried at 120° C. for 12 hours. After measuring the mass of the membrane of the polymer after drying, the membrane of the polymer was immersed in a 0.85 mol/g sodium hydroxide solution (solvent: water/methanol=10/90 (mass ratio)) at 60° C. for at least 72 hours to hydrolyze ion exchange groups. It was obtained by back titrating the hydrolyzed sodium hydroxide solution with 0.1 mol/L hydrochloric acid. Further, in the present specification, the ion exchange capacity of the polymer F or polymer F' is the same as the ion exchange capacity of the polymer H or polymer H' in which fluorosulfonyl groups of the polymer F are converted to sulfonic acid groups.

(Proportions of the Respective Units)

The proportions of the respective units in the polymer F or polymer F' were calculated from the ion exchange capacity of the polymer F or polymer F'.

(TQ Value)

Using a flow tester (CFT-500A, manufactured by Shimadzu Corporation) equipped with a nozzle with a length of 1 mm and an inner diameter of 1 mm, a polymer is melt-extruded while changing the temperature under the condition of an extrusion pressure of 2.94 MPa (gauge pressure). The temperature (TQ value) at which the extrusion amount of the polymer F or polymer F' became 100 mm$^3$/sec was obtained. When the TQ value exceeded 300° C., the TQ value was obtained by extrapolating from the measured value of the extrusion amount of 300° C. or lower. Extrapolation was performed by a logarithmic approximation of the correlation of extrusion amount with respect to the reciprocal of absolute temperature. The higher the TQ value, the larger the molecular weight of the polymer.

(Abbreviations)

TFE: tetrafluoroethylene,
PSAE: $CF_2=CFCF_2OCF_2CF_2SO_2F$,
PFtBPO: $(CF_3)_3COOC(CF_3)_3$,
tBPO: $(CH_3)_3COOC(CH_3)_3$,
HFC-52-13p: $CF_3(CF_2)_5H$,
HFE-347pc-f: $CF_3CH_2OCF_2CF_2H$,
P2SAE: The following formula

Ex. 1

Ex. 1-1

Into a 2 L four-necked flask equipped with a stirrer, a condenser, a thermometer and a dropping funnel, 560 g of chlorosulfonic acid was charged under nitrogen gas sealing. The flask was cooled in an ice bath, and a mixed solution of 139.5 g of compound 1-1 and 478.7 g of dichloromethane was added dropwise over 20 minutes, while keeping the internal temperature to be at most 20° C. Heat generation and gas generation were observed during the dropping. After completion of the dropping, the flask was set in an oil bath, and the reaction was conducted for 7 hours, while keeping the internal temperature at from 30 to 40° C. The reaction proceeded with the generation of gas, and a white solid was precipitated. After the reaction, the pressure inside the flask was reduced to distill off dichloromethane. A yellowish white solid remained in the flask. When the solid was analyzed by $^1$H-NMR, it was confirmed that compound 2-1 was formed.

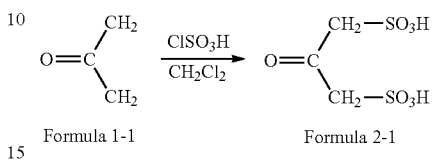

Formula 1-1          Formula 2-1

NMR Spectrum of Compound 2-1:
$^1$H-NMR (solvent: $D_2O$): 4.27 ppm (—$CH_2$—, 4H, s).
$^{13}$C-NMR (solvent: $D_2O$): 62.6 ppm (—$CH_2$—), 195.3 ppm (C=O).

Ex. 1-2

The compound 2-1 obtained in Ex. 1-1 was used as it was in the next reaction without being isolated. 2,049 g of thionyl chloride was added to the flask of Ex. 1-1. The flask was heated to 80° C. and refluxed for 15 hours. As the reaction proceeded, the reflux temperature increased from 52° C. to 72° C. Gas generation was confirmed during the reaction. The point at which all of the compound 2-1 was dissolved and the gas generation stopped was taken as the reaction end point. When the reaction solution was transferred to a 2 L separable flask and left to cool for 9 hours, while sealing the gas phase portion with nitrogen gas, a dark brown solid was precipitated in the separable flask. Unreacted thionyl chloride was removed by decantation. Toluene was added to wash the precipitated solid, and the toluene was removed again by decantation. Toluene washing was carried out a total of 3 times, and the total amount of toluene used was 1,207 g. The precipitated solid was dried at 25° C. for 71 hours under a nitrogen gas stream. The dried solid was recovered and analyzed by $^1$H-NMR, and it was confirmed that 356.5 g of compound 3-1 having a purity of 96.2% was obtained. The yield based on the compound 1-1 was 56.0%.

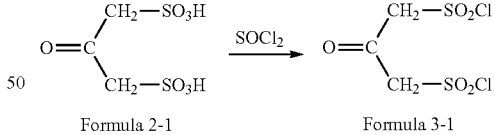

Formula 2-1          Formula 3-1

NMR Spectrum of Compound 3-1:
$^1$H-NMR: 5.20 ppm (—$CH_2$—, 4H, s).
$^{13}$C-NMR: 72.3 ppm (—$CH_2$—), 184.6 ppm (C=O).

Ex. 1-3

Into a 1 L four-necked flask equipped with a stirrer, a condenser and a thermometer, 90.0 g of the compound 3-1 and 750 ml of acetonitrile were charged under nitrogen gas sealing. The flask was cooled in an ice bath, and 110.3 g of potassium hydrogen fluoride was added with stirring. The heat generation associated with the addition was slight. The ice bath was changed to a water bath, and the reaction was carried out for 62 hours, while maintaining the internal temperature at from 15 to 25° C. Along with the reaction, a fine white solid was formed. The reaction solution was transferred to a pressure filter, and unreacted potassium hydrogen fluoride and the product were separated by filtration. Acetonitrile was added to the filter, and the separated solid was washed until the filtrate became transparent, and the washing solution was recovered. Acetonitrile was distilled off by applying a filtrate and a washing solution to an evaporator. 950 mL of toluene was added to the solid remaining after drying, and the mixture was heated to 100° C. to dissolve the solid in toluene. The dissolved liquid was filtered by gravity filtration to remove undissolved components. When the filtrate was transferred to a 1 L separable flask and left to cool for 14 hours, while sealing the gas phase with nitrogen gas, light brown needle-like crystals were precipitated in the separable flask. The crystals were washed with toluene and dried at 25° C. for 30 hours under a nitrogen gas stream. When the dried solid was recovered and analyzed by $^1$H-NMR and $^{19}$F-NMR, it was confirmed that 58.1 g of compound 4-1 having a purity of 97.6% was obtained. The yield based on the compound 3-1 was 72.3%.

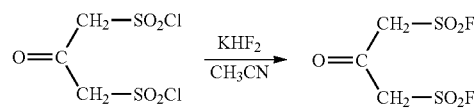

Formula 3-1    Formula 4-1

NMR Spectrum of Compound 4-1:
  $^1$H-NMR: 4.97 ppm (—CH$_2$—, 4H, d, J=3.1 Hz).
  $^{19}$F-NMR: 62.4 ppm (—SO$_2$F, 2F, t, J=3.1 Hz).
  $^{13}$C-NMR: 60.7 ppm (—CH$_2$—), 184.9 ppm (C=O).

Ex. 1-4

Into a 200 mL nickel autoclave, 9.93 g of the compound 4-1 and 89.7 g of acetonitrile were charged. The autoclave was cooled, nitrogen gas was fed at a flow rate of 6.7 L/hr, while maintaining the internal temperature at from 0 to 5° C., and the reaction solution was bubbled for 1 hour. While maintaining the temperature of the reaction solution at from 0 to 5° C., a mixed gas of fluorine gas and nitrogen gas (mixing ratio=10.3 mol %/89.7 mol %) was introduced at a flow rate of 6.7 L/hr over 6 hours. Nitrogen gas was fed again at a flow rate of 6.7 L/hr, and the reaction solution was bubbled for 1 hour. 103.2 g of the reaction solution was recovered from the autoclave. When the reaction solution was quantitatively analyzed by $^{19}$F-NMR, it was confirmed that compound 5-1 was contained in an amount of 8.4 mass %. The reaction yield based on the compound 4-1 was 66%.

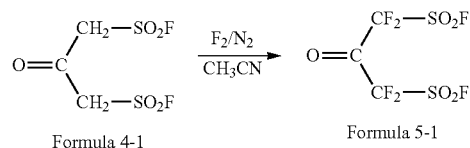

Formula 4-1    Formula 5-1

NMR Spectrum of Compound 5-1:
  $^{19}$F-NMR: −104.1 ppm (—CF$_2$—, 4F, s), 45.8 ppm (—SO$_2$F, 2F, s).

Ex. 1-5

Into a 200 mL nickel autoclave, 19.9 g of the compound 4-1 and 85.6 g of acetonitrile were charged. The autoclave was cooled, nitrogen gas was fed at a flow rate of 6.7 L/hr, while maintaining the internal temperature at from 0 to 5° C., and the reaction solution was bubbled for 1 hour. While maintaining the temperature of the reaction solution at from 0 to 5° C., a mixed gas of fluorine gas and nitrogen gas (mixing ratio=10.3 mol %/89.7 mol %) was introduced at a flow rate of 16.4 L/hr over 6.5 hours. Nitrogen gas was fed again at a flow rate of 6.7 L/hr, and the reaction solution was bubbled for 1 hour. 109.6 g of the reaction solution containing compound 5-1 was recovered from the autoclave.

Ex. 1-6

Into a 200 mL nickel autoclave, 20.1 g of the compound 4-1 and 80.1 g of acetonitrile were charged. The autoclave was cooled, nitrogen gas was fed at a flow rate of 6.7 L/hr, while maintaining the internal temperature at from 0 to 5° C., and the reaction solution was bubbled for 1 hour. While maintaining the temperature of the reaction solution at from 0 to 5° C., a mixed gas of fluorine gas and nitrogen gas (mixing ratio=20.0 mol %/80.0 mol %) was introduced at a flow rate of 8.4 L/hr over 6 hours. Nitrogen gas was fed again at a flow rate of 6.7 L/hr, and the reaction solution was bubbled for 1 hour. 107.1 g of the reaction solution containing compound 5-1 was recovered from the autoclave.

Ex. 1-7

Into a 50 mL four-necked flask equipped with a stirrer, a condenser, a thermometer and a dropping funnel, 1.65 g of potassium fluoride and 7.8 mL of diethylene glycol dimethyl ether (diglyme) were charged. The flask was cooled in an ice bath and stirred, and, while maintaining the internal temperature at from 0 to 10° C., 8.43 g of the reaction solution obtained in Ex. 1-4 was added dropwise using a plastic syringe. Strong heat generation was confirmed, and it took 15 minutes for the dropping. After completion of the dropping, the ice bath was replaced with a water bath, and the reaction was carried out at from 15 to 20° C. for 1 hour. The mixture was cooled again in an ice bath, and 6.56 g of compound 6-1 was added dropwise from the dropping funnel, while maintaining the temperature of the reaction solution at from 0 to 10° C. After completion of the dropping, the ice bath was replaced with a water bath and the reaction was conducted at 20 to 25° C. for 3.5 hours. A by-product solid was removed from the reaction solution by suction filtration, and the filtrate was collected. The filtered residual solid was washed with an appropriate amount of acetonitrile, and the washing liquid was mixed with the filtrate. When 37.1 g of the filtrate was quantitatively analyzed by $^{19}$F-NMR, it was confirmed that monomer 1-1 was contained in an amount of 2.04 mass %. The reaction yield based on the compound 4-1 was 46.6%.

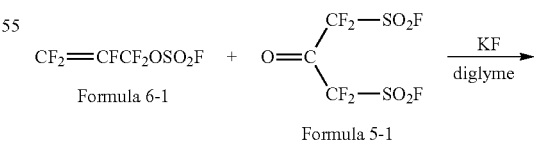

Formula 6-1    Formula 5-1

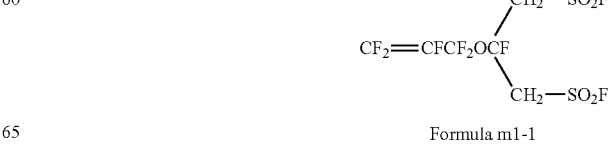

Formula m1-1

NMR Spectrum of Monomer m1-1:

$^{19}$F-NMR: −191.5 ppm (CF$_2$=CF—, 1F, ddt, J=116, 38, 14 Hz), −133.8 ppm (—O—CF—, 1F, tt, J=21.3, 6.1 Hz), −103.1 ppm (—CF$_2$—SO$_2$F, 4F, m), −101.5 ppm (CF$_2$=CF—, 1F, ddt, J=116, 49, 27 Hz), −87.6 ppm (CF$_2$=CF—, 1F, ddt, J=49, 38, 7 Hz), −67.5 ppm (—CF$_2$—O—, 2F, m), 46.8 ppm (—SO$_2$F, 2F, s).

Ex. 1-8

Into a 500 mL four-necked flask equipped with a stirrer, a condenser, a thermometer and a dropping funnel, 36.6 g of potassium fluoride and 125.6 g of acetonitrile were charged. The flask was cooled in an ice bath and stirred to keep the internal temperature to be from 0 to 10° C., and 79.8 g of the reaction solution obtained in Ex. 1-5 was added dropwise using a plastic dropping funnel. Strong heat generation was confirmed, and it took 23 minutes for the dropping. After completion of the dropping, the ice bath was replaced with a water bath, and the reaction was carried out at from 20 to 30° C. for 5.5 hours. The mixture was cooled again in an ice bath, and 146.0 g of compound 6-1 was added dropwise from the dropping funnel, while maintaining the temperature of the reaction solution at from 0 to 10° C. After completion of the dropping, the ice bath was replaced with a water bath and the reaction was conducted at from 15 to 25° C. for 16 hours. Suction filtration was performed in the same manner as in Ex. 1-7, and 412.3 g of the obtained filtrate was quantitatively analyzed by $^{19}$F-NMR, and it was confirmed that monomer m1-1 was contained in an amount of 3.93 mass %. The reaction yield based on the compound 4-1 was 55.9%. The filtrate was distilled under reduced pressure to isolate compound 7-1 as a fraction having a boiling point of 97.2° C./10 kPa. The gas chromatography purity was 98.0%.

Ex. 1-9

Into a 50 mL four-necked flask equipped with a stirrer, a condenser, a thermometer and a dropping funnel, 3.70 g of potassium fluoride and 10.9 g of acetonitrile were charged. The flask was cooled in an ice bath and stirred, and 10.2 g of the reaction solution obtained in Ex. 1-6 was added dropwise using a plastic syringe, while keeping the internal temperature at from 0 to 10° C. Strong heat generation was confirmed, and it took 8 minutes for the dropping. After completion of the dropping, the ice bath was replaced with a water bath, and the reaction was carried out at from 20 to 30° C. for 3 hours. The mixture was cooled again in an ice bath, and 14.6 g of compound 6-1 was added dropwise from the dropping funnel while maintaining the temperature of the reaction solution at from 0 to 10° C. After completion of the dropping, the ice bath was replaced with a water bath, and the reaction was carried out at from 15 to 25° C. for 17 hours. Suction filtration was performed in the same manner as in Ex. 1-7, and 55.9 g of the obtained filtrate was quantitatively analyzed by $^{19}$F-NMR, and it was confirmed that monomer m1-1 was contained in an amount of 4.77 mass %. The reaction yield based on the compound 4-1 was 69.6%. The reaction yield based on the compound 1-1 (reaction yield in the entire monomer synthesis step) was 28.2%.

Ex. 2

Into an autoclave (internal volume 100 mL, made of stainless steel), 70.0 g of the monomer m1-1 was put, cooled with liquid nitrogen and degassed. 2.53 g of TFE was introduced into the autoclave and heated in an oil bath until the internal temperature reached 100° C. The pressure at this time was 0.29 MPa (gauge pressure). The TFE partial pressure was 0.39 MPa. A mixed solution of 36.3 mg of PFtBPO as a polymerization initiator and 2.58 g of HFC-52-13p was injected into the autoclave. Furthermore, nitrogen gas was introduced from the injection line, and the injecting liquid in the injection line was completely pushed in. As a result of diluting TFE of the gas phase portion by this operation, the pressure increased to 0.56 MPa (gauge pressure). Polymerization was carried out by continuously adding TFE, while maintaining the pressure at 0.56 MPa (gauge pressure). When the amount of TFE added reached 4.03 g in 9.5 hours, the inside of the autoclave was cooled to stop the polymerization, and the gas in the system was purged. The reaction solution was diluted with HFC-52-13p, HFE-347pc-f was added, and the polymer was precipitated and filtered. Then, the operation of stirring the polymer in HFC-52-13p and reprecipitating by HFE-347pc-f was repeated twice. Vacuum drying was conducted at 120° C. to obtain 6.4 g of polymer F′-1 as a copolymer of TFE and the monomer m1-1. The results are shown in Table 1. When HFC-52-13p and HFE-347pc-f used for precipitation were dried to dryness, 0.1 g of an oligomer component was extracted. That is, the oligomer content was at most 2 mass %.

Ex. 3

The respective conditions in Ex. 2 were changed as shown in Table 1. The polymerization initiator was tBPO, and the polymerization temperature was 125° C. Except for this, in the same manner as in Ex. 2, polymer F-1 as a copolymer of TFE and the monomer m1-1, was obtained. The results are shown in Table 1.

Ex. 4 to Ex. 7

The respective conditions in Ex. 2 were changed as shown in Table 1. Instead of injecting the polymerization initiator in a batch at the initial stage, after diluting with nitrogen gas while maintaining the predetermined polymerization temperature, TFE in the amount of TFE partial pressure shown in Table 1 was charged to bring the polymerization pressure as shown in Table 1, and then, a 0.20 mass % solution of tBPO dissolved in monomer m1-1 was intermittently added from the injection line at the start of polymerization and every 30 minutes (the total amount of the polymerization initiator and monomer m1-1 added, is shown in Table 1). Except for this, in the same manner as in Ex. 2, polymers F-2 to F-5 which are copolymers of TFE and the monomer m1-1, were obtained. The results are shown in Table 1.

Ex. 8

Into an autoclave (internal volume 230 mL, made of stainless steel), 175.0 g of PSAE was put, cooled with liquid nitrogen and degassed. The mixture was heated in an oil bath until the internal temperature reached 110° C., and TFE was introduced into the system to maintain the pressure to be 0.27 MPa (gauge pressure).

A mixed solution of 55.3 mg of PFtBPO as a polymerization initiator and 8.45 g of HFC-52-13p was injected into the autoclave. Furthermore, nitrogen gas was introduced from the injection line, and the injecting liquid in the injection line was completely pushed in. As a result of diluting TFE in the gas phase by this operation, the pressure increased to 0.68 MPa (gauge pressure). Polymerization was carried out by continuously adding TFE, while maintaining the pressure at 0.68 MPa (gauge pressure). When the amount of TFE added reached 11.25 g in 5.0 hours, the inside of the autoclave was cooled to stop the polymerization, and the gas in the system was purged. The reaction solution was diluted with HFC-52-13p, HFE-347pc-f was added, and the polymer was precipitated and filtered. Then, the operation of stirring the polymer in HFC-52-13p and reprecipitating at HFE-347pc-f was repeated twice. Vacuum drying was conducted at 120° C. to obtain polymer F'-2 which is a copolymer of TFE and PSAE. The results are shown in Table 1.

Ex. 9

The respective conditions in Ex. 8 were changed as shown in Table 1. However, in Ex. 9, instead of injecting the polymerization initiator in a batch at the initial stage, after diluting with nitrogen gas to a predetermined polymerization pressure, a 0.50 mass % solution of PFtBPO dissolved in PSAE was intermittently added from the injection line at the start of polymerization and every 60 minutes (the total amount of the polymerization initiator and PSAE added is shown in Table 1). Except for this, in the same manner as in Ex. 8, polymer F'-3 which is a copolymer of TFE and PSAE, was obtained. The results are shown in Table 1.

Ex. 10

Polymer F'-4, which is a copolymer of TFE and PSAE, was obtained in accordance with the procedure in Ex. 1 of Japanese Patent No. 5217708.

Ex. 11

Polymer F'-5, which is a copolymer of TFE and PSAE, was obtained in accordance with the procedure in Ex. 4 of Japanese Patent No. 5217708.

Ex. 12

Polymer F'-6, which is a copolymer of TFE and P2SAE, was obtained in accordance with the procedure in Ex. 5 of Japanese Patent No. 5217708.

In Ex. 3 to Ex. 7, polymers F-1 to F-5 of which the TQ value is at least 220° C. and the ion exchange capacity is from 1.81 to 2.5 milliequivalent/gram dry resin, are obtainable with Rp (productivity index) being at least 1.0. In Ex. 2, polymer F'-1 of which the TQ value is at least 220° C. and the ion exchange capacity is from 1.81 to 2.5 milliequivalent/gram dry resin, can be obtained, but Rp (productivity index) was less than 1. Of the polymers F'-2 to F'-6 in Ex. 8 to Ex. 12, the ion exchange capacity was less than 1.81 milliequivalent/gram dry resin.

This application is a continuation of PCT Application No. PCT/JP2019/047949, filed on Dec. 6, 2019, which is based upon and claims the benefit of priority from Japanese Patent Application No. 2018-230213 filed on Dec. 7, 2018 and Japanese Patent Application No. 2019-036946 filed on Feb. 28, 2019. The contents of those applications are incorporated herein by reference in their entireties.

What is claimed is:

1. A method for producing a fluorosulfonyl group-containing fluorinated polymer, comprising polymerizing a monomer represented by formula m1 and tetrafluoroethylene at a temperature of at least 110° C. and at most 250° C.:

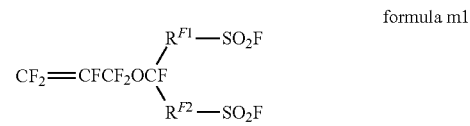

formula m1 wherein $R^{F1}$ and $R^{F2}$ are each independently a $C_{1-3}$ perfluoroalkylene group;

further comprising producing at least 1.0 g of the fluorosulfonyl group-containing fluorinated polymer per 100 g of a total amount of the monomer represented by formula m1 charged before and during the polymerization and per hour of polymerization time.

2. The method for producing a fluorosulfonyl group-containing fluorinated polymer according to claim 1,

TABLE 1

|  | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|
| Reactor volume [ml] | 100 | 100 | 100 | 100 | 100 | 100 | 230 | 230 | 125 | 125 | 125 |
| Type of comonomer | m1-1 | m1-1 | m1-1 | m1-1 | m1-1 | m1-1 | PSAE | PSAE | PSAE | PSAE | P2SAE |
| Comonomer [g] | 70.0 | 104.9 | 75.2 | 72.6 | 77.3 | 78.06 | 175.0 | 175.0 | 88.0 | 88.0 | 88.0 |
| HFC-52-13p [g] | 2.58 | 3.05 | 0 | 0 | 0 | 0 | 8.45 | 0 | 0 | 0 | 0 |
| Type of polymerization initiator | PFtBPO | tBPO | tBPO | tBPO | tBPO | tBPO | PFtBPO | PFtBPO | BPO | tBPO | tBPO |
| Amount of polymerization initiator [mg] | 36.3 | 21.7 | 10.4 | 6.3 | 14.6 | 16.1 | 55.3 | 35.7 | 9.8 | 4.9 | 4.9 |
| Polymerization temperature [° C.] | 100 | 125 | 160 | 160 | 150 | 150 | 110 | 120 | 145 | 170 | 145 |
| TFE partial pressure [MPa] | 0.39 | 0.45 | 0.47 | 0.50 | 0.50 | 0.525 | — | — | — | — | — |
| Pressure before dilution with nitrogen gas [MPaG] | 0.29 | 0.36 | — | — | — | — | 0.27 | 0.28 | — | — | — |
| Polymerization pressure [MPaG] | 0.56 | 0.67 | 0.75 | 0.80 | 0.78 | 0.82 | 0.68 | 0.63 | 0.95 | 1.59 | 0.66 |
| Continuously added TFE [g] | 4.03 | 7.65 | 7.22 | 6.85 | 11.25 | 13.63 | 11.25 | 9.15 | 9.00 | 2.92 | 5.00 |
| Polymerization time [h] | 9.5 | 10.5 | 8.5 | 8.5 | 9.0 | 10 | 5.0 | 5.6 | 6.5 | 6.5 | 6.5 |
| Type of polymer F, F' | F'-1 | F-1 | F-2 | F-3 | F-4 | F-5 | F'-2 | F'-3 | F'-4 | F'-5 | F'-6 |
| Yield of polymer [g] | 6.4 | 11.7 | 15.0 | 13.9 | 21.5 | 24.66 | 18.8 | 15.6 | 10.8 | 3.5 | 6.0 |
| Rp (productivity index) [g/(100 g · h)] | 0.96 | 1.06 | 2.35 | 2.25 | 3.09 | 3.16 | 2.14 | 1.59 | 1.89 | 0.61 | 1.05 |
| Comonomer units [mol %] | 13.8 | 15.1 | 21.3 | 19.8 | 18.2 | 16.9 | 17.0 | 20.4 | 23.8 | 25.8 | 14.0 |
| TFE units [mol %] | 86.2 | 84.9 | 78.7 | 80.2 | 81.8 | 83.1 | 83.0 | 79.6 | 76.2 | 74.2 | 86.0 |
| Ion exchange capacity [milliequivalent/gram dry resin] | 1.87 | 1.99 | 2.46 | 2.35 | 2.24 | 2.14 | 1.22 | 1.39 | 1.54 | 1.62 | 1.55 |
| TQ value [° C.] | 238 | 272 | 251 | 310 | 281 | 303 | 240 | 240 | 217 | 240 | 210 | wherein a TQ value of the fluorosulfonyl group-containing fluorinated polymer is at least 220° C.

3. A method for producing a salt-type sulfonic acid group-containing fluorinated polymer, comprising:
   producing a fluorosulfonyl group-containing fluorinated polymer by the method according to claim 1; and
   hydrolyzing fluorosulfonyl groups of the fluorosulfonyl group-containing fluorinated polymer to form salt-type sulfonic acid groups.

4. The method for producing a salt-type sulfonic acid group-containing fluorinated polymer according to claim 3, wherein an ion exchange capacity of the salt-type sulfonic acid group-containing fluorinated polymer is from 1.81 to 2.50 milliequivalent/gram dry resin.

5. A method for producing an acid-type sulfonic acid group-containing fluorinated polymer, comprising:
   producing a salt type sulfonic acid group-containing fluorinated polymer by the method according to claim 3; and
   converting salt-type sulfonic acid groups in the salt type sulfonic acid group-containing fluorinated polymer to an acid-type to obtain acid-type sulfonic acid groups.

6. The method for producing an acid-type sulfonic acid group-containing fluorinated polymer according to claim 5, wherein an ion exchange capacity of the acid-type sulfonic acid group-containing fluorinated polymer is from 1.81 to 2.50 milliequivalent/gram dry resin.

7. A method for producing a salt-type sulfonic acid group-containing fluorinated polymer, comprising:
   producing a fluorosulfonyl group-containing fluorinated polymer by the method according to claim 2; and
   hydrolyzing fluorosulfonyl groups of the fluorosulfonyl group-containing fluorinated polymer to form salt-type sulfonic acid groups.

* * * * *